United States Patent [19]

Carter et al.

[11] 4,334,603
[45] Jun. 15, 1982

[54] ARTICLE DECELERATING ASSEMBLY AND METHOD

[75] Inventors: Howard J. Carter, Santa Clara; William C. Staiger, Cupertino, both of Calif.

[73] Assignee: Acurex Corporation, Mountain View, Calif.

[21] Appl. No.: 172,565

[22] Filed: Jul. 28, 1980

[51] Int. Cl.³ .............................................. B65G 11/20
[52] U.S. Cl. ..................................... 193/32; 209/908; 209/638
[58] Field of Search ............... 209/638, 639, 908, 509, 209/606; 221/312 R; 193/7, 32

[56] References Cited

U.S. PATENT DOCUMENTS

| | | | |
|---|---|---|---|
| 592,133 | 10/1897 | Davis | 193/32 |
| 791,224 | 5/1905 | Spooner | 221/312 R |
| 3,187,872 | 6/1965 | Hill et al. | 193/32 X |
| 3,750,881 | 8/1973 | Husome et al. | 209/639 X |

*Primary Examiner*—Joseph J. Rolla
*Attorney, Agent, or Firm*—Flehr, Hohbach, Test

[57] ABSTRACT

An apparatus of the type in which relatively small and fragile articles such as shelled peanuts move along a given path is disclosed herein along with an assembly for decelerating movement of the articles along a particular section of the path. The section selected is one into which the articles initially enter while in flight but at a downward angle towards an article support surface. A first arrangement of elongated, flexible flaps is provided for intercepting at least some of the articles as the latter first enter this path section in order to slow them down before they reach the support surface. A second flap arrangement is located behind the first arrangement and serves to intercept all of the articles including those which have and have not been intercepted by the first arrangement, again to slow the articles down before they reach the support surface. A third flap arrangement is provided behind the second arrangement for slowing the articles once the latter have reached the article support surface.

16 Claims, 6 Drawing Figures

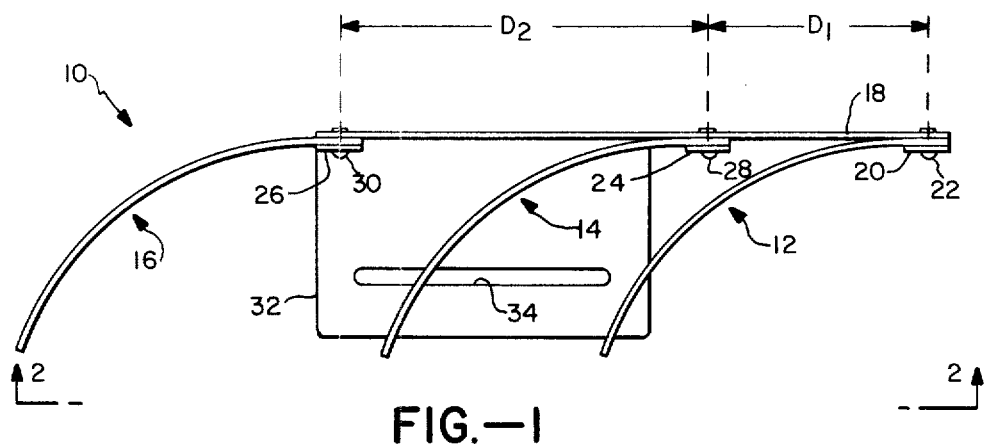
FIG.—1
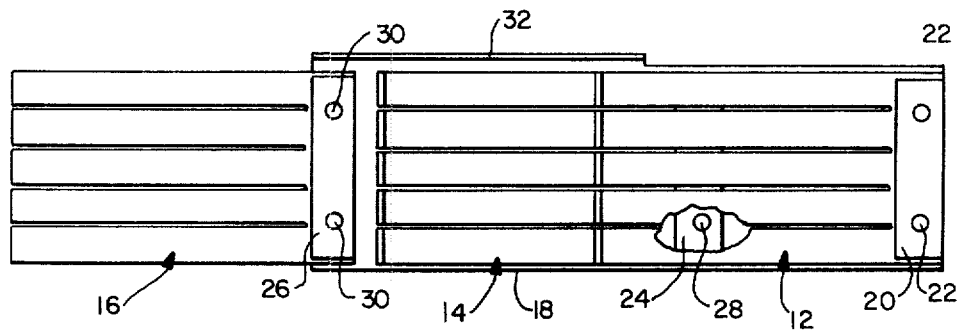
FIG.—2
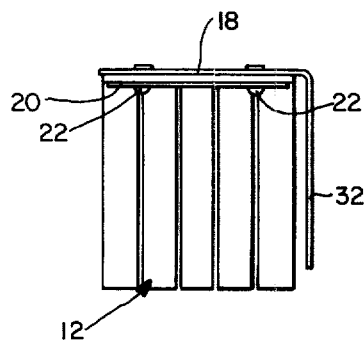
FIG.—3

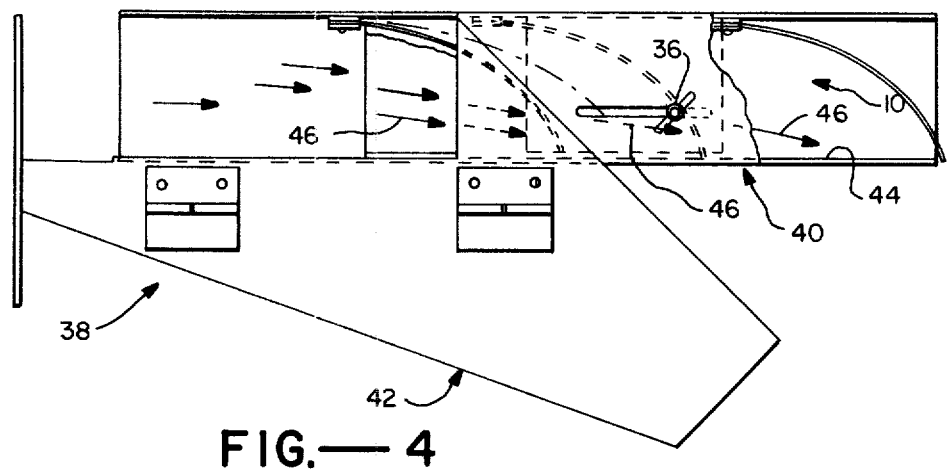
FIG.—4
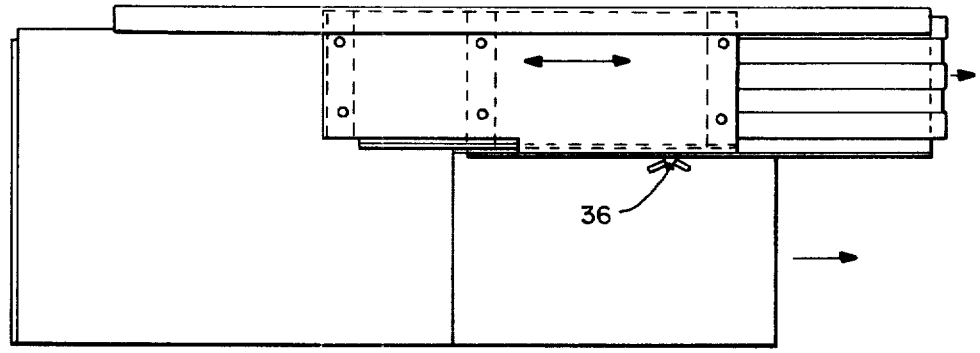
FIG.—5
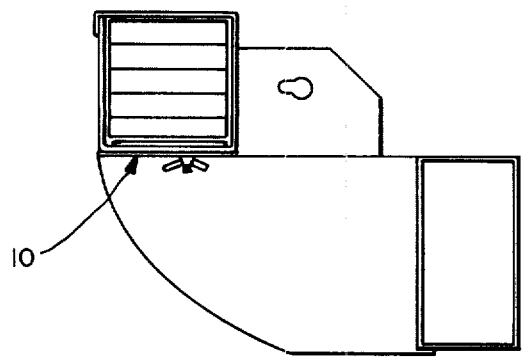
FIG.—6

ARTICLE DECELERATING ASSEMBLY AND METHOD

The present invention relates generally to apparatus of the type in which relatively small and fragile articles such as shelled peanuts move along a given path and more particularly to a specific assembly for and method of decelerating movement of these articles along a straight section of the path, especially a section into which the articles initially enter while in flight but at a downward angle towards an article support surface extending the length of the path section.

As will be seen hereinafter, the present invention is especially suitable for use in an article sorting apparatus of the type described in U.S. Pat. No. 3,750,881 (Husome et al) which issued Aug. 7, 1973. The apparatus disclosed in this patent includes a hopper adapted to receive product to be sorted, e.g., relatively small articles such as shelled peanuts, a vibratory feeder which accepts the articles from the hopper and delivers them to counter-rotating rollers. On these rollers, the articles form a single file and are accelerated under gravitational forces to relatively high speeds. At the end of the rollers, the articles pass through an inspection station which determines which ones are to be rejected and which are not. The articles thereafter pass through a rejection station in which those which have not passed inspection are diverted from their path of movement onto a different path leading to a reject bin or the like. As the acceptable articles move through and past the reject station, they do so while in free-fall flight under the influence of gravity but at a downward angle towards an article support surface along a somewhat parabolic trajectory, although this is not discussed in the Husome et al patent.

The feature of particular interest in the Husome et al patent recited above resides in the particular way the rejected articles are diverted from their initial path into a rejection path. This aspect of the apparatus is quite satisfactory for its intended purpose and the apparatus as a whole has been found to be satisfactory when the articles being sorted are not particularly fragile as, for example, in the case of raw coffee beans. However, more fragile articles such as shelled whole peanuts are subject to breakage upon impact with the previously mentioned support surface as these peanuts, that is, the ones which pass inspection, pass through the reject station comprising part of the above described apparatus. Since whole peanuts demand a greater price in the market place than broken peanuts, it is desirable to keep breakage to a minimum.

In view of the foregoing, one object of the present invention is to provide an uncomplicated, reliable and yet economical decelerating assembly for use in an apparatus of the type described in the previously recited Husome et al patent or a like apparatus for minimizing breakage or damage to articles as the latter move in the general manner described above.

A more particular object of the present invention is to provide an article decelerating assembly which serves to slow down the articles while the latter are in flight and before they reach their support surface without changing their flight path to any significant extent, that is, without deflecting the articles.

Another particular object of the present invention is to provide an article decelerating assembly of the type just described and specifically one which uses successive means for intercepting the articles in flight so as to minimize the possibility of any article reaching its support surface before being intercepted and slowed down.

Still another particular object of the present invention is to provide an article decelerating assembly which can be adjusted longitudinally along the path of movement of the articles so as to insure that the articles are intercepted at the appropriate points in their flight.

As will be seen hereinafter, the apparatus disclosed herein whether it be of the specific type disclosed in the Husome et al patent described above or a different type of apparatus is nevertheless one in which relatively small and fragile articles such as shelled peanuts move along a given path. As will also be seen, the assembly disclosed herein is one which serves to decelerate movement of the articles along a particular section of the path. This assembly includes first and second elongated, flexible flap means and preferably a third elongated, flexible flap means having top and bottom ends. Means are provided for supporting the top ends of the flap means such that the latter extend downward in spaced apart confronting relationship with one another. These support means and flap means are maintained in a fixed position relative to the given path such that the first and second flap means and the third flap means, when provided, extend downward into the path for successively intercepting the articles as the latter move thereby.

In the particular apparatus disclosed herein, the articles initially move into the path of interception while in flight but at a downward angle towards their article support surface, as described previously. In a preferred embodiment, the first flexible flap means comprising a part of the decelerating assembly (or like means) serves to intercept at least some of the articles to slow them down, without deflecting them, before the articles reach the support surface. The second flap means (or like means) located behind the first flap means also serves to intercept the articles in the same way, including those articles which have and have not been intercepted by the first means. This preferred embodiment includes a third flap means in a position behind the second flap means for slowing down the articles once the latter have reached the support surface. In this way, the amount of damage or breakage to the articles as a result of the impact of the latter against the support surface is minimized.

The decelerating assembly will be described in more detail hereinafter, both apart from its associated apparatus and as part of the latter, in conjunction with the drawings, wherein:

FIG. 1 is a side elevational view of an article decelerating assembly designed in accordance with a preferred embodiment of the present invention and shown apart from its associated apparatus;

FIG. 2 is a plan view illustrating the underside of the assembly of FIG. 1, as viewed along line 2—2 in FIG. 1;

FIG. 3 is a rearward end view, in elevation, of the deceleration assembly of FIG. 1;

FIG. 4 is a side elevational view of one portion of a sorting apparatus generally of the type described in the previous Husome et al patent, specifically a chute assembly comprising part of the apparatus, in combination with the decelerating assembly of FIGS. 1-3;

FIG. 5 is a top plan view of the chute and decelerating assemblies of FIG. 4; and FIG. 6 is a front end view, in elevation, of the chute and decelerating assemblies of FIG. 5.

Turning now to the drawings, wherein like components are designated by like reference numerals throughout the various figures, attention is first directed to FIGS. 1-3 which illustrate an article decelerating assembly 10 designed in accordance with the present invention. As seen in these figures, assembly 10 includes three arrangements of elongated, flexible flaps, a first or front arrangement generally indicated at 12 in FIG. 1 (the flaps being indicated at 12a), a second or intermediate arrangement generally indicated at 14 (flaps 14a) and a third or rearward arrangement generally indicated at 16 (flaps 16a). As best seen in FIG. 2 in conjunction with FIG. 1, each flap arrangement includes a plurality of flaps, specifically five in the embodiment illustrated, each of which includes a top end section and bottom end section, as best shown in FIG. 1. For reasons to be discussed hereinafter, each of the flaps is constructed of an energy absorbing material, preferably an energy absorbing elastomer. In an actual working embodiment, the material used is an elastomer referred to as ISODAMP, manufactured by EAR, a division of Cabot Corporation. The three flap arrangements 12, 14 and 16 are supported at top end sections thereof to the underside of a horizontally extending support plate 18. More specifically, the top end sections of the flaps 12a comprising arrangement 12 are fixedly attached to the underside of plate 18 at its front edge by means of a connecting plate 20 which is fastened to the support plate by rivets 22 or other suitable means with the top end sections of the flaps therebetween. The top end sections of flaps 14a and 16a are fixedly connected to the underside of support plate 18 in the same manner, that is, using connector plates 24, 26 and associated rivets or like means 28, 30, respectively.

As best seen in FIG. 1, the various flaps 12a are supported at their top end sections such that these flaps extend downward therefrom in an outwardly or rearwardly curving fashion. This is also true for flaps 14a and 16a. For reasons to be discussed hereinafter, the distance $D_1$ between the supported top ends of flaps 12a and 14a and the distance $D_2$ between the supported top ends of flaps 14a and 16a are carefully selected in a preferred embodiment such that the distance $D_1$ is substantially less than the distance $D_2$. In an actual working embodiment, the distance $D_2$ is twice that of distance $D_1$.

In addition to the foregoing, overall assembly 10 includes a mounting bracket 32 integrally formed with or otherwise connected to and along one edge of support plate 18 and depending vertically downwardly therefrom, as best seen in FIGS. 1 and 3. As seen in FIG. 1, a horizontally extending slot 34 is provided through bracket 32. As will be seen hereinafter with respect to FIGS. 4-6, the bracket 32 serves to fixedly maintain the entire assembly in the desired position in its associated apparatus and the slot 34 in combination with a cooperating wingnut 36 (see FIGS. 4-6) serve to adjust the position of the assembly in the manner to be described.

Referring now to FIGS. 4-6, attention is directed to a way in which assembly 10 functions to decelerate articles moving along a particular path section in an associated apparatus, for example, one of the general type disclosed in the Husome et al patent, as stated previously. As also stated, this apparatus includes a chute assembly generally indicated at 38 in FIGS. 4-6.

Assembly 38 includes a section 40 which defines a main path of movement for the articles acted upon by the apparatus. A second section 42 serves to define a diverted path of movement. In the case of the apparatus in the Husome et al patent which is provided for sorting acceptable articles such as shelled peanuts from rejects, section 40 defines an accept chute including a bottom article support surface 44 and section 42 defines a reject chute. As described in the Husome et al patent, the articles being sorted enter an inspection station, one at a time, where it is determined whether or not they are acceptable or if they are to be rejected. Those articles which are to be rejected are diverted by suitable means into the reject chute. The accepted articles continue along their original path which includes the accept chute. As they do so, they enter this latter chute while in free-fall flight under the influence of gravity but in a downwardly angled direction toward article support surface 44 along a somewhat parabolic trajectory, as indicated by arrows 46.

As seen best in FIG. 4, article decelerating assembly 10 is fixedly located within section 40 of chute assembly 42 by fixedly attaching bracket 32 (in a horizontal plane) to one side wall of section 40 (also extending in a horizontal plane). In this regard, a through hole is provided in the side wall in cooperation with previously described slot 34 and the wingnut 36 is used in conjunction with the through hole and slot for mounting assembly 10 in place. Because of slot 34, the entire assembly can be adjusted to various positions along the length of section 40.

As seen best in FIG. 4, assembly 10 is positioned along the length of section 44 such that all three flap arrangements 12, 14 and 16 extend downward in a rearwardly curved fashion into the path of movement of articles 46. In a preferred and actual working embodiment, flap arrangement 12 serves to intercept at least some and preferably most of the articles as the latter enter the accept chute while still in flight and before they reach surface 44. The flaps making up this arrangement serve to slow down the intercepted articles but are not designed to deflect them and do not do so in any significant way. As a result of the continuous interaction between the flaps 12a and the articles they intercept, the flaps themselves remain substantially continuously in a rearwardly deflected position indicated by dotted lines in FIG. 4. As a result, some of the articles entering the accept chute may pass under the deflected flaps without being intercepted, as indicated by the additional dotted arrow 46. However, in a preferred embodiment of the present invention, the flaps 14a making up arrangement 14 are positioned to intercept these latter articles as well as those which have been intercepted by arrangement 12, again before any of the articles reach surface 44 and without deflecting the articles. In this way, by the time the articles reach surface 44, between arrangements 14 and 16, as indicated by still another dotted arrow 46, they will have slowed down sufficiently to minimize breakage or damage thereto.

It should be apparent from the foregoing that the entire assembly 10 is to be positioned in the accept chute so as to be sure the flap arrangement 12 is properly positioned to intercept at least some and preferably most of the articles as the latter enter the chute. This may require changing the position of bracket 32 until a proper position is found. Once the first flap arrangement 12 is properly positioned, arrangement 14 will also be in proper position. In this regard, the distance $D_1$ (FIG. 1) between the supported top end sections of the flaps 12a and 14a should be sufficiently large so that deflection of the flaps 12a does not cause these flaps to engage against the flaps 14a but sufficiently small so that all of the articles passing arrangement 12 (including those intercepted and those not intercepted) are intercepted by the flaps 14a before the articles reach surface 44. In this regard, all of the flaps in each arrangement should be sufficiently long so that their bottom ends touch surface 44 as illustrated in FIG. 4. This maximizes the surface area of each flap which can be used to intercept articles as the latter pass down the chute.

As stated above, once the articles pass the second flap arrangement 14 and before reaching arrangement 16 they are slow enough to contact surface 44 without much damage or breakage thereto. Arrangement 16 therefore serves to intercept and slow these articles down as the latter move along surface 44 and is positioned to do so relative to arrangement 14. In a preferred and actual embodiment, arrangement 16 is positioned such that distance $D_2$ is approximately twice that of distance $D_1$, as stated previously. This allows the flaps making up arrangement 16 to slow the articles down and yet provides sufficient room between the last two flap arrangements so that the articles therebetween do not back up to an extent which causes them to interfere with flap arrangement 14.

From the foregoing, it should be apparent that decelerating assembly 10 may be used in apparatus other than the one described in the Husome et al patent. In fact, as stated previously, this assembly can be used in combination with any apparatus of the type in which relatively small and fragile articles such as shelled peanuts move along a given path and particularly an apparatus in which the articles come into a given path section while in flight in the manner described previously.

What is claimed is:

1. In an apparatus of the type in which relatively small and fragile articles such as shelled peanuts move along a path and initially into a given section of the latter at a downward angle towards an article support surface, an assembly for decelerating movement of said articles along the given section of said path, said assembly comprising first and second elongated, flexible flap means having top and bottom ends, means for supporting said flap means at their top ends such that the flap means extend downward in spaced apart confronting relationship with one another, and means for maintaining said support means in a fixed position relative to said given path section such that said first and second flap means extend downward into said path section for successively intercepting said articles as the latter move through the path section said first flap means being positioned to intercept said articles before the latter reach said surface and being sufficiently flexible such that impingement of said articles onto said first flap means causes the latter to deflect upwardly and rearwardly in the direction of movement of said articles such that some other articles first entering said path section in flight pass under said first flap means while in fight without impinging on the latter, and said second flap means being located sufficiently close to said first flap means so as to intercept said other articles before the latter reach said article support surface.

2. An assembly according to claim 1 wherein said flap means are made of an energy absorbing elastomer.

3. An assembly according to claim 1 wherein said support means supports top end sections of said flap means such that the latter extend downward therefrom in an outwardly curving fashion whereby the bottom ends of the flaps are located in said given path section downstream of their respective top ends.

4. An assembly according to claim 1 wherein each of said flap means includes a plurality of individual flaps positioned in side-by-side relationship to one another.

5. An assembly according to claim 1 wherein said maintaining means includes means for adjusting the fixed position of said support means in the lengthwise direction of said path section whereby to adjust the positions of said flap means along the length of said path.

6. An assembly according to claim 1 wherein said flap means are of sufficient length such that their bottom ends just touch said surface.

7. An assembly according to claim 1 wherein both of said flap means are made of an energy absorbing material such that impingement thereon by said articles while the latter are in flight does not deflect said articles from their flight path but rather slows them down.

8. An assembly according to claim 1 including a third flap means having top and bottom ends, said supporting means supporting said third flap means at its top end such that said third flap means extends downward in spaced apart confronting relationship to said second flap means, opposite said first flap means, sufficient to slow down said articles after they reach said support surface behind said second flap means.

9. An assembly according to claim 8 wherein the distance between the supported top ends of said first and second flap means is sufficiently great to prevent said first flap means from contacting said second flap means when the former are deflected and the latter are at rest.

10. An assembly according to claim 9 wherein the distance between said second and third flap means is approximately twice the distance between said first and second flap means.

11. In an apparatus of the type in which relatively small and fragile articles such as shelled peanuts move along a path and initially into a given section of the latter at a downward angle towards an article support surface, an assembly for decelerating movement of said articles as the latter pass into said given path section, said assembly comprising first means located in said given path section and intercepting said articles before the latter reach said article support surface for slowing down said intercepted articles without altering their flight path to any appreciable extent, and second means located in said path section downstream of said first means but sufficiently close to the latter to intercept all of said articles including those which may not have been intercepted by said first means before said articles reach said surface for slowing down said articles without altering their flight path to any appreciable extent, whereby the articles upon reaching said support surface have been sufficiently slowed down to minimize breakage thereto upon impact with said support surface.

12. An assembly according to claim 11 including a third means located in said path section downstream of said second means for further slowing down said articles once the latter have reached said article support surface.

13. An assembly according to claim 12 wherein each of said first, second and third means includes at least one elongated flap made of an energy absorbing, flexible material and means for supporting said flap in a fixed position in said path section.

14. An assembly according to claim 13 wherein each of said intercepting means includes a plurality of said flaps.

15. An assembly according to claim 14 wherein each of said first, second and third article intercepting means includes a plurality of elongated, flexible flaps made from energy absorbing elastomer and means connected with the top ends of said flaps for supporting the latter in position in said path section, all of the flaps of said first, second and third means being supported such that the distance between the first plurality of flaps and the second plurality of flaps is substantially less than the distance between the second plurality of flaps and the third plurality of flaps, said assembly also including means for adjustably fixing the position of all of said intercepting flaps along the length of said path section, whereby the positions of the intercepting means can be varied along said path section.

16. A method of decelerating relatively small fragile articles such as shelled peanuts in a given path section in an apparatus of the type in which said articles move along a path and initially into said given section of the latter at a downward angle towards an article support surface, said method comprising the steps of intercepting said articles in said given path section before the latter reach said article support surface for slowing down said intercepted articles without altering their flight path to any appreciable extent, downstream therefrom initially intercepting all of said articles including those which may not have been initially intercepted before said articles reach said surface for slowing down said articles without altering their flight path to any appreciable extent, whereby the articles upon reaching said support surface have been sufficiently slowed down to minimize breakage thereto upon impact with said support surface.

* * * * *